US006594977B2

(12) United States Patent
Jander

(10) Patent No.: US 6,594,977 B2
(45) Date of Patent: Jul. 22, 2003

(54) SEED COLLECTOR

(75) Inventor: Georg Jander, Jamaica Plain, MA (US)

(73) Assignee: Monsanto Technology, LLC, St. Louis, MO (US)

( * ) Notice: Subject to any disclaimer, the term of this patent is extended or adjusted under 35 U.S.C. 154(b) by 0 days.

(21) Appl. No.: 09/941,228

(22) Filed: Aug. 28, 2001

(65) Prior Publication Data

US 2003/0041576 A1 Mar. 6, 2003

Related U.S. Application Data

(63) Continuation-in-part of application No. 29/146,568, filed on Aug. 10, 2001, now abandoned.

(51) Int. Cl.[7] ............................................. A01D 45/30
(52) U.S. Cl. ................................................. 56/1
(58) Field of Search .......................... 47/79, 80, 81, 47/82, 66, 77, 39; 56/1; 111/100, 104, 106

(56) References Cited

U.S. PATENT DOCUMENTS 2,406,439 A * 8/1946 Pratt, Sr. ...................... 47/79
3,137,096 A * 6/1964 Hopkins ...................... 47/79
5,852,895 A * 12/1998 Sinanan ....................... 47/39

FOREIGN PATENT DOCUMENTS

BE            1004098 A6      9/1992

OTHER PUBLICATIONS

ARACONs User's Guide, www.arasystem.com/userguide-.html, pp. 1–3. no date.
ARACONs product page, www.arasystem.com/aracon.html, p. 1 of 1.

* cited by examiner

*Primary Examiner*—Robert E. Pezzuto
(74) *Attorney, Agent, or Firm*—Connie M. Caron; Thomas E. Kelley

(57) ABSTRACT

An improved tubular seed collecting device comprising a funnel-shaped base which protrudes into the tubular space of the device. The seed collecting device has tabs on its legs and/or elongated bosses on the inside wall of the cup. The tabs serve to limit the insertion of the legs into the plant growth medium to allow horizontal growth of the plant under the level of the cup. The tabs and the bosses improve the air flow through the device. Sturdier leg design allows more re-use of each device.

10 Claims, 2 Drawing Sheets

PRIOR ART

SEED COLLECTOR

CROSS-REFERENCE TO RELATED APPLICATION

This application is a continuation in part of Ser. No. 29/146,568, an Application for Design Patent, filed Aug. 10, 2001, now abandoned, incorporated herein by reference.

BACKGROUND

In plant genetic research operations it is often desired to grow and harvest seeds in a manner which avoids cross-fertilization of flowers and contamination with seeds from adjacent plants. *Arabidopsis thaliana* is a small flowering plant which is widely used by plant science researchers as a model organism for plant genetic research. Belgian Patent publication BE 1004098 discloses a seed harvesting device, as illustrated in FIG. 1, comprising a cup 1 and detachable tube 2. FIG. 1 also shows a plant 3 growing inside the device. A prior art seed harvesting device is available from Vivaldi bvba of Ghent, Belgium under the trade name ARACONS™ and is commonly used to grow and harvest Arabidopsis seed. The cup has a funnel-shaped base. Legs extending from the bottom of the cup can be inserted into growing medium to maintain the cup over the center of the plant leaves after bolting has occurred. The legs are rectangular in cross section and break easily when bent in use or when being cleaned for reuse. The detachable tube 2 comprises a rolled plastic sheet which is held by the cup wall and serves to isolate flowers and maturing siliques on a growing plant from neighboring plants in a flat of multiple plants and minimizes cross-pollination of flowers. The outer surface of the inverted funnel-shaped base serves to guide a growing plant stalk through the base of the cup and into the isolated space of the tube. The inner surface of the inverted funnel-shaped base serves to collect seeds falling from a mature plant. Seeds can be passively collected as they fall from a mature plant or actively harvested by manually pulling the cup up and off of the plant. In either case the base of the cup holds segregated seed from the plant.

Among the disadvantages of the prior art seed collector device is that it is difficult to insert the legs to a uniform depth in the plant growth medium when dealing with many plants. When the seed collectors are used for Arabidopsis and similar plants the cup being close to the plant growth medium presents a barrier for leaf growth. Arabidopsis plants are characterized by a set of broad leaves at the base of the plant and seed bearing stalks. The leaf growth of an Arabidopsis rosette is inhibited when the legs of a seed collector device are inserted too deeply in the growth medium. Another disadvantage of the cup being located on or close to the growth medium is that there is a tendency for condensation to form inside the collector. Since some seeds will fall off of the plant before harvesting, it is desirable to prevent condensation in the seed collector cup. Seeds that fall into a damp cup may rot, begin to germinate or become contaminated with mold. Such seeds may not be suitable for storage and/or later viable.

An object of this invention is to provide improved seed collecting devices which assist in uniform depth of leg insertion. A further object of this invention is to provide seed collectors which minimize condensation and resulting problems of harvested seed quality within the device. A further object of this invention is to provide lower cost seed dispensers that are made from low cost materials and/or more durable design. These and other objects, which will be apparent to those skilled in the art from reading the following detailed description of the invention, are provided by the various embodiments disclosed and claimed herein.

SUMMARY OF THE INVENTION

Disclosed herein are improved seed collectors adapted for harvesting segregated seed from individual plants, and methods of using the seed collectors. The various aspects of this invention are especially useful for harvesting segregated seed from small seeded-plants used in plant genetic research, e.g. seeds from *Arabidopsis thaliana* plants.

This invention provides an improved seed collector comprising a cup and extended tube. The cup has a central hole in a funnel shaped base extending into said cup. The extended tube can be either integral with or detachable from the cup. One aspect of this invention provides one or more elongated bosses on the inside wall of the cup to provide separation between the cup wall and a detachable extended tube, thereby allowing airflow between the base and tube to lessen condensation within the seed collector. Another aspect of the invention provides a leg tab to limit depth to which a leg can be inserted into plant growth medium, thereby providing (each) the cup base at a consistent distance above the plant growth medium and reduced condensation in the seed dispenser. Depth limiting tabs also allow horizontal growth of the plant under the base of the cup. Another aspect of this invention provides a seed collector cup with sturdier legs to avoid breakage during insertion or cleaning for re-use.

DETAILED DESCRIPTION OF PREFERRED EMBODIMENTS

Figure 1:
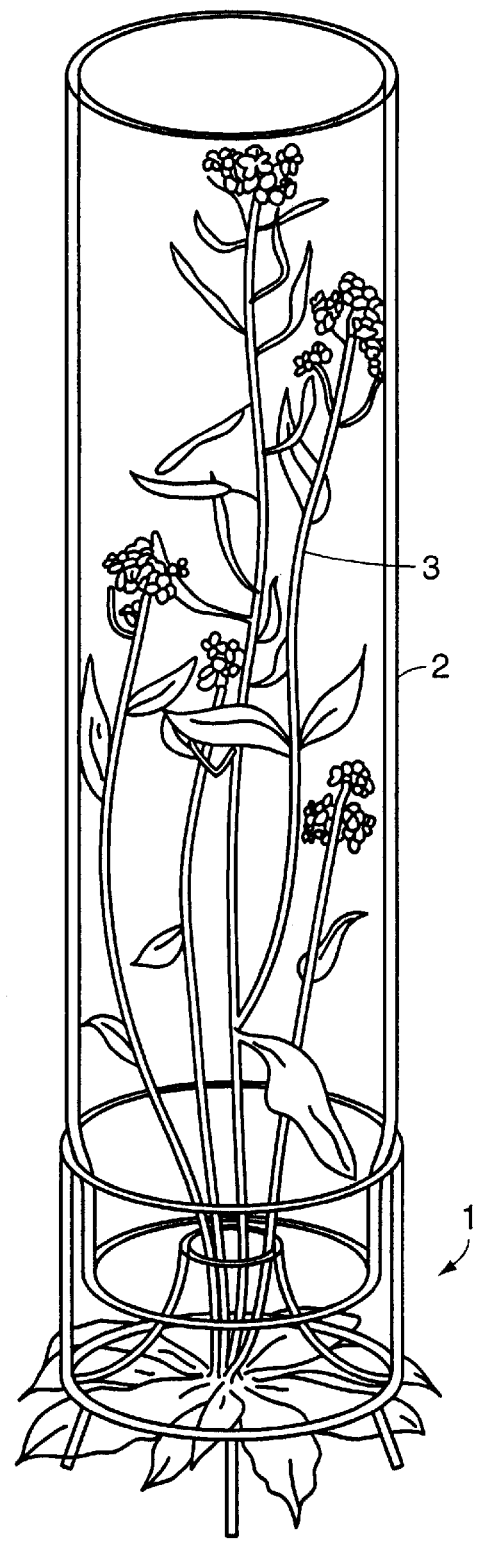
FIG. 1 illustrates the prior art.
Figure 2:
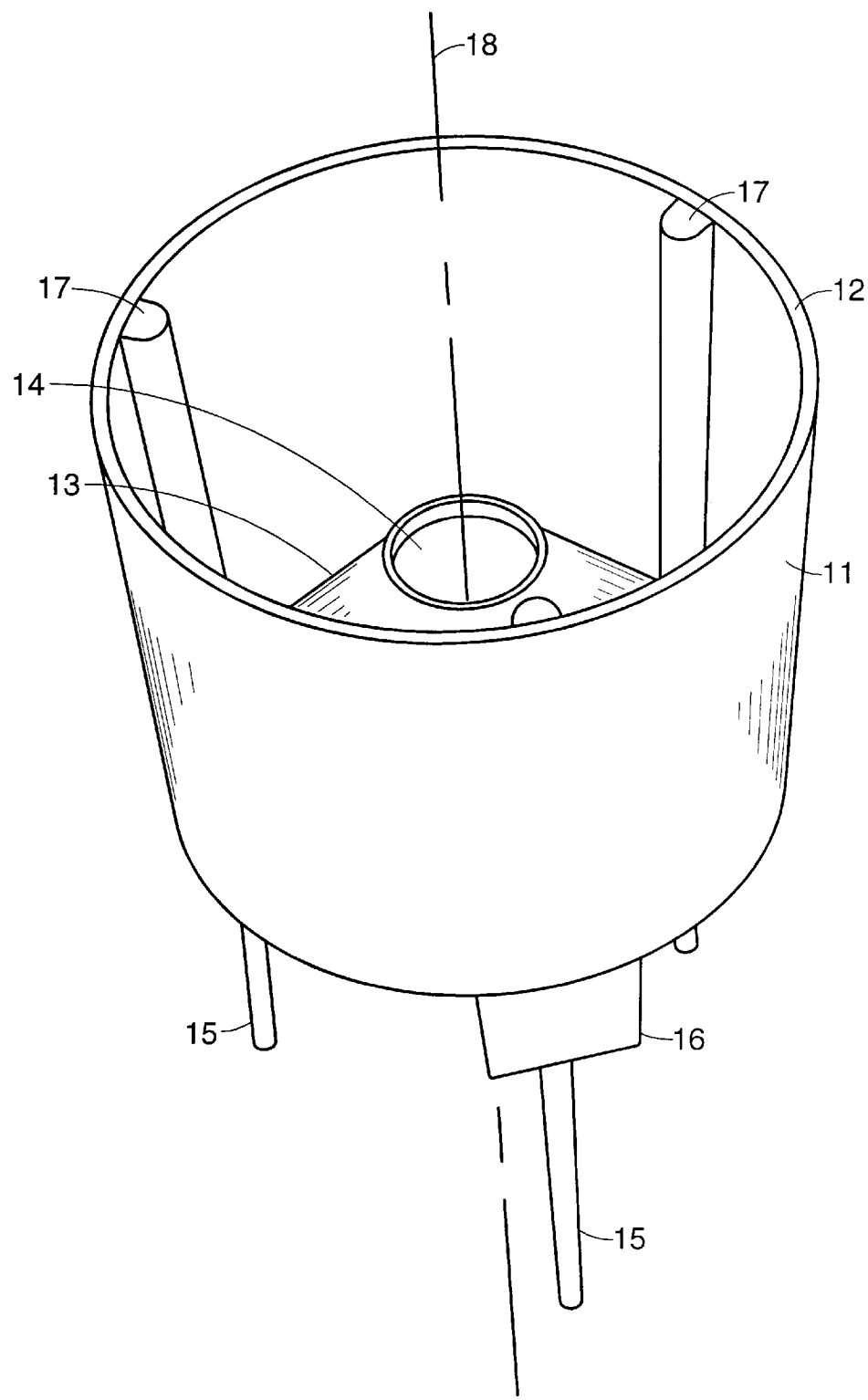
FIG. 2 illustrates an embodiment of a seed collector according to the invention.

With reference to FIG. 2 there is shown a seed collector cup 11 having a wall 12 and an inverted, funnel-shaped base 13 with a central hole 14 through which a growing plant stalk can easily enter the seed collecting cup. There are connected to the base one or more legs 15 which can be inserted into plant growth medium, e.g. soil to maintain the seed collector in place about a plant stalk. A preferred embodiment has at least three legs for stability. In a preferred aspect of the invention, the legs have tabs 16 to assist in maintaining the seed collector at a fixed height, e.g. about 5 to 20 mm, over the plant growth medium. In one embodiment the length of the wall 12 can be long, e.g. equivalent to the length of a detachable extended tube, thereby providing an integral extended tube. In other embodiments, the length of wall 12 can be short, e.g. about the same as its cross section diameter, when a detachable extended tube is used to isolate the plant. A commonly used detachable extended tube is a flexible plastic sheet (not shown) inserted into the cup. In preferred embodiments for use with a detachable extended tube, the cup will have at least one elongated boss 17 which is preferably parallel to the axis 18 of the cup. Such bosses serve to hold the detachable extended tube away from the cup wall thereby allowing airflow.

The legs preferably extend from the base at a radial dimension less than that of the outer radius of the base to facilitate stacking. Sturdier legs can be achieved by simply designing them to have a round cross-section rather than the rectangular cross section of the legs of the prior art device.

The various parts of the seed collecting device may be any clear material such as glass or plastic. Seed collectors are preferably manufactured from a thermoplastic, e.g. a vinyl polymer such as polystyrene, a polyolefin such as polyethylene or polypropylene, a polyester such as polyethylene terephthalate, a polyamide such as nylon-6 or nylon-6,6, a polycarbonate, a polyacetal and the like. The selection of polymeric material is not critical and can be selected on the basis of light transparency, resistance to static electric charge, cost, durability, processability, method of manufacture, cleaning for re-use, interaction with plants or seed, ability for marking, e.g. with printed or attached bar code identification, and the like. A preferred, low cost material with a good balance of properties for the seed collector of this invention is polystyrene. The resistance to static electric charge is especially important when collecting Arabidopsis seed which are very small and lightweight, on the order of 50,000 seeds per gram.

In preferred embodiments of this invention, the seed collector is sized to collect seeds from individual small plants such as *Arabidopsis thaliana*. The seed collector of this invention is designed for Arabidopsis and similar small plants which are suitable for controlled growth in restricted space. A seed collector of this invention is easily manually placed over a young plant or seedling and is removable from the mature plant for the purpose of harvesting segregated seeds from the individual plant. The seed collector is not a grain seed storage device for mixtures of seeds from many plants. In another preferred embodiment, the central hole is large enough to allow growth of plant stalks through yet small enough to minimize seed loss, so that most (if not essentially all) seeds don't fall through the central hole but onto the inside surface of the funnel shaped base. For Arabidopsis plants, a central hole diameter size of about 10 mm is preferred. The diameter of the cup is preferably 3 to 7 times the diameter of the hole. The size of the cup should be wide enough for an inserted detachable extended tube having about the same diameter to allow the stalks to grow unrestricted and with adequate room for airflow.

The use of the seed collector is illustrated for an *Arabidopsis thaliana* plant in the following steps:

1) the seed collector is placed over the rosette of a single plant prior to the plant bolting. It is positioned over the plant to allow the plant stalks to be directed by the outside wall of the inverted funnel-shaped base to grow through the central hole. The legs of the seed collector are inserted into the plant growth medium to the depth of the leg tab.
2) as the plant grows and prior to flowering, a detachable extended tube is placed in the seed collector inside the cup. The detachable elongated tube and the seed collector form a seed collector system. The elongated bosses on the inner surface of the cup serve to hold the detachable extended tube away from the inner surface of the cup to allow airflow around the plant and thereby decrease condensation formation in the seed collector system. The detachable tube serves to isolate the Arabidopsis plant, particularly its flowers and seeds, from neighboring plants.
3) after the plant matures it is allowed to dry
4) the seeds are harvested by pinching the detachable elongated tube to dislodge seeds that remain on the dried plant to cause the seeds to fall into the cup and/or by simply lifting the seed cup over the top of the stalks and allowing the rim of the central hole to dislodge any unfallen seeds. The inverted funnel shaped base serves to guide the seeds into the seed collector cup during harvesting.
5) the seeds may then be transferred to a tube, e.g. a microcentrifuge tube for storage and/or dispensing (see, for example, U.S. application Ser. No. 09/897, 351, incorporated herein by reference)

Having disclosed the best modes contemplated for making and using the invention applicant intends the following claims to extend to and capture the full spirit and breadth of the invention including other embodiments not disclosed but which will be apparent to those skilled in the art after reading this disclosure.

What is claimed is:

1. A tubular seed collector comprising:
   (a) a cup having a wall and a funnel-shaped base extending into said cup and,
   (b) at least one leg extending from said base wherein said leg has a tab to limit the depth of to which the leg can be inserted into a plant growth medium.

2. A seed collector according to claim 1 wherein said cup has at least one elongated boss on an inner surface of said wall.

3. A seed collector according to claim 2 having three elongated bosses.

4. A seed collector system comprising a seed collector according to claim 1 and an elongated tube inserted into the cup of said seed collector.

5. A method of harvesting seed from *Arabidopsis thaliana* plants growing through a tubular seed collector of claim 1, said method comprising the steps of:
   a) growing an *Arabidopsis thaliana* plant in said collectors,
   b) lifting said cup past said plant to harvest seeds.

6. A tubular seed collector comprising a cup having a wall, an inner surface of said wall, and a funnel shaped base extending into said cup and at least one elongated boss on an inner surface of said wall.

7. A seed collector according to claim 6 further comprising at least one leg extending from said base.

8. A seed collector as in claim 1 or claim 7 wherein said leg has a circular cross section.

9. A seed collector sized for manually harvesting seed from individual mature *Arabidopsis thaliana* plants, comprising:
   (a) a cup having a wall and a funnel-shaped base extending into said cup and,
   (b) at least one leg extending from said base wherein said leg has a tab to limit the depth of to which the leg can be inserted into a plant growth medium.

10. A seed collector according to claim 9 wherein said cup has at least one elongated boss on an inner surface of said wall.

* * * * *